O. N. COLLINS & P. B. STILES.
Draft-Equalizers.
No. 145,474. Patented Dec. 9, 1873.
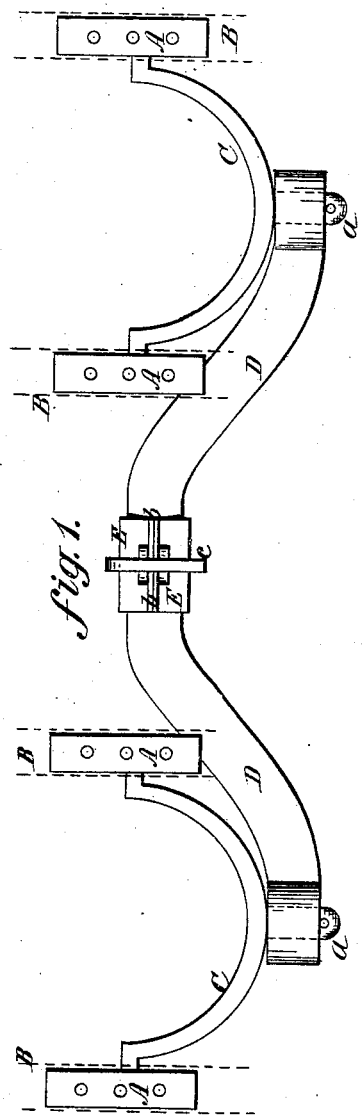
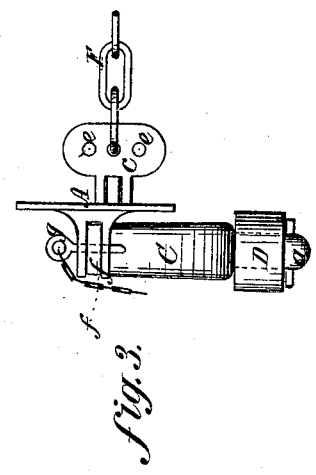
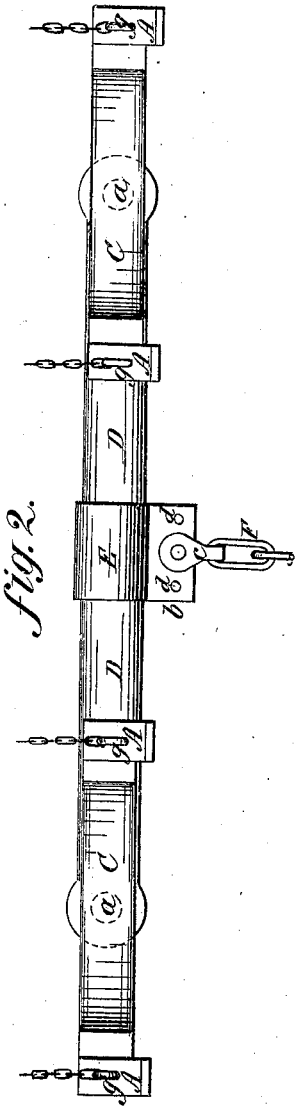
Witnesses:
J. West Wagner,
J. R. Rutherford.
Inventors:
Owen N. Collins,
Peter B. Stiles,
by Johnson and Johnson
their Attorneys.

UNITED STATES PATENT OFFICE.

OWEN N. COLLINS AND PETER B. STILES, OF CEDAR RAPIDS, IOWA.

IMPROVEMENT IN DRAFT-EQUALIZERS.

Specification forming part of Letters Patent No. 145,474, dated December 9, 1873; application filed November 20, 1873.

*To all whom it may concern:*

Be it known that we, OWEN N. COLLINS and PETER B. STILES, of Cedar Rapids, in the county of Linn and State of Iowa, have invented certain new and useful Improvements in Draft Attachments for Double Teams, of which the following is a specification:

Our invention relates to yokes for cattle; and is adapted for the attachment of a central draft-chain, whereby the single-trees are dispensed with, and the great annoyance experienced in plowing, by reason of the entanglement of the traces and their connections with standing grain, twigs, brush, &c., avoided.

Another object of our invention is to gage the strain of draft upon both horses in proportion to their capacity. To this end our invention consists, first, in the combination and arrangement of the bow-yokes with the hames; and, second, in the combination of the pivoted equalizing draft-bar with said yokes, the construction, operation, and purpose of which will be hereinafter more fully set forth, reference being had to the drawings accompanying this specification, in which—

Figure 1 represents an elevation of the yoke; Fig. 2, a top view, and Fig. 3 an end view.

The plates A are securely fastened to the ordinary hames B upon the shoulders of the horses, so that their necks may move freely within the bows C, secured to said plates, as will be presently described. A draft-bar, D, is pivoted at $a\ a$ to the center of each bow, which draft-bar D is provided with a draft-clasp, E, the edges of which meet and are secured together to form a projecting rest, $b$, for the draft clevis-chain F, which is attached by means of holes $d$ therein; and when one horse is weaker than the other, the clevis $c$ is shifted into one of the holes $d$, to the right or left of the center, as may be required.

In order to adjust the draft to the shoulders of different horses, the draft-chain is shifted from the top or bottom hole $e$, as may be necessary. The bows C are pivoted to the draft-bar D so as to move freely, to accommodate their position to the movement of each of the horses; and any rigidity which might annoy the animals and confuse their motions is thereby avoided. The plates A have jaws $f$, to receive the ends of the bows C, which are fastened thereto by removable pin-bolts $g$, secured to the hames by small chains, so that to unharness the team it is only required, after detaching the draft-chain, to withdraw the pins and walk out the animals.

The equalization of the draft of double teams has been effected by means of attachments pivoted to the beam and connected to the double-tree by pivoted levers, so that the unequal draft of the team would be compensated for through the single and double trees; and as to such devices, our invention differs and has many advantages.

We claim—

1. The combination of the bow-yokes C with the plates A of the harness, as and for the purpose described.

2. The combination of yokes C with the equalizing draft-bar D, as and for the purpose described.

3. The projecting rest $b$, provided with holes $e$, as and for the purpose described.

4. The combination of the projecting rest $b$ and clevis $c$, as described.

OWEN N. COLLINS.
      PETER B. STILES.

Witnesses:
 I. N. WHITTAM,
 L. M. AYERS.